OVER-TRAVEL AND RETURN MECHANISM FOR DOOR

Original Filed Feb. 8, 1971 4 Sheets-Sheet 1

OVER-TRAVEL AND RETURN MECHANISM FOR DOOR

Original Filed Feb. 8, 1971 4 Sheets-Sheet 2

OVER-TRAVEL AND RETURN MECHANISM FOR DOOR

Original Filed Feb. 8, 1971 4 Sheets-Sheet 3

OVER-TRAVEL AND RETURN MECHANISM FOR DOOR

Original Filed Feb. 8, 1971 4 Sheets-Sheet 4

United States Patent

Re. 28,443

Reissued June 10, 1975

28,443

OVER-TRAVEL AND RETURN MECHANISM FOR DOOR

Irving D. Ross, Jr., Barrington, and Thorvald Madland, Arlington Heights, Ill., assignors to The Youngstown Steel Door Co., Cleveland, Ohio Original No. 3,747,270, dated July 24, 1973, Ser. No. 113,143, Feb. 8, 1971. Application for reissue June 26, 1974, Ser. No. 483,111

Int. Cl. E05d *15/10*

U.S. Cl. 49—220 4 Claims

Matter enclosed in heavy brackets [ ] appears in the original patent but forms no part of this reissue specification; matter printed in italics indicates the additions made by reissue.

ABSTRACT OF THE DISCLOSURE

The specification and drawings disclose a plug-type door assembly particularly suited for use on rail cars. The door assembly includes the usual door member carried on *at least first and second* vertically extending shaft and crank assemblies provided with *respective first and second* rollers on which the door can be moved longitudinally of a door opening. Actuating means are provided for selectively rotating the crank assemblies to cause the door to move into and out of the opening. The actuating means are of the type having both anti-overspin and anti-drift characteristics. Located adjacent the door opening is a cushion member which is adapted to absorb the kinetic energy of the door. Means including a lost motion connection and a spring are associated with the *first shaft and* crank [assemblies] *assembly* for permitting inward movement of the leading edge portion of the door toward the cushion member when a stop member engages the *first* crank assembly. After engagement with the cushion member, the spring assembly returns the door to a full open position.

The present invention is directed toward the rail car art and, more particularly, to an improved return and shock cushioning arrangement for plug-type doors.

Plug-type rail car doors are in wide use and generally comprise a relatively heavy door assembly carried on vertical pipes or shafts. The pipes are provided at their opposite ends with crank arms and rollers. The rollers ride on tracks extending along the side of the car and allow the door to move longitudinally to and from the door opening. When the door is positioned in front of the door opening, rotation of the shafts causes the door to be moved into and out of the opening.

In the commonly assigned [co-pending application, Ser. No. 50,288, filed June 26, 1970,] *U.S. Pat. No. 3,660,938, issued May 9, 1972,* for "Dual Brake Type Drive Mechanism," we have disclosed a mechanism which overcomes two particular problems when used as an operating mechanism for plug-type doors. First, the mechanism prevents "overspinning" (acceleration of the manual operating handle out of control of the operator by forces acting on the door) and "drifting" (inadvertent movement of the door toward and away from the car when in the open position).

An additional problem which is present in plug-type doors involves stopping the door at the end of movement along the longitudinal tracks. As can be appreciated, the door has substantial mass and is difficult to stop without substantial impact on the door and its drive mechanism. Although it has been proposed that shock absorbing door stops or cushions be provided, the problem has been that in order to engage the edge of the door in its open position, the stops had to extend laterally of the car a substantial distance. This was generally unacceptable.

The present invention provides a mechanism which overcomes the above problem and is especially suited for use on plug-type doors having both anti-drift and anti-overspin actuating mechanisms of the type described in the aforementioned patent application. The inventive mechanism is arranged to direct the door inwardly toward a cushion member at the end of its travel so that the door's kinetic energy is absorbed by the cushion without damage to the door, the crank assemblies, or the drive mechanism. The arrangement is such that the cushion member or members do not have to extend outwardly of the car any appreciable distance. Also, no impact forces can be transmitted through the guide wheels or rollers to the drive mechanism and the mechanism functions to return the door to a full open position (i.e., the position it had immediately prior to moving inwardly toward the cushion).

In accordance with one aspect of the invention, an improvement is provided for a plug-type rail car door of the general type including a door member carried on *at least first and second* vertically extending extending shaft and crank assemblies including *respective first and second* roller means to allow the door to move laterally into and out of a door opening in the side of a car, as well as, to move longitudinally of the car in first and second directions. The improvement comprises door actuating means for selectively rotating the crank members to cause the door to move into and out of the opening. Preferably, but not necessarily, the actuating means include means for selectively maintaining the door in a position outwardly of the opening during longitudinal movement. Associated with the door are stop means arranged to engage at least [one] *the first* of the assemblies when the door is moving in the first direction, and over-travel means for permitting movement of at least the leading edge portion of the door toward the car upon engagement of the *first* shaft and crank assembly with the stop means.

Preferably, and in accordance with an aspect of the invention, a cushion means is located to engage the leading edge portion of the door when it moves inwardly toward the car and thereby absorb the kinetic energy of the door. The over-travel means further includes spring means to return the door to its full open position or the position it had immediately prior to engagement with the stop means.

Accordingly, a primary object of the invention is the provision of a door operating mechanism of the general type described wherein the door is stopped in the manner described without damage and automatically returned to the position it had prior to being stopped.

A further object is the provision of a plug door assembly arranged such that the kinetic energy of the moving door is absorbed by a cushion or stop member spaced inwardly of the door's open position.

A further object is the provision of a plug door assembly of the type described which is relatively simple and which prevents any undue impact forces from acting against the door operating mechanism.

These and other objects and advantages will become apparent from the following description when read in conjunction with the accompanying drawings wherein.

Figure 1:
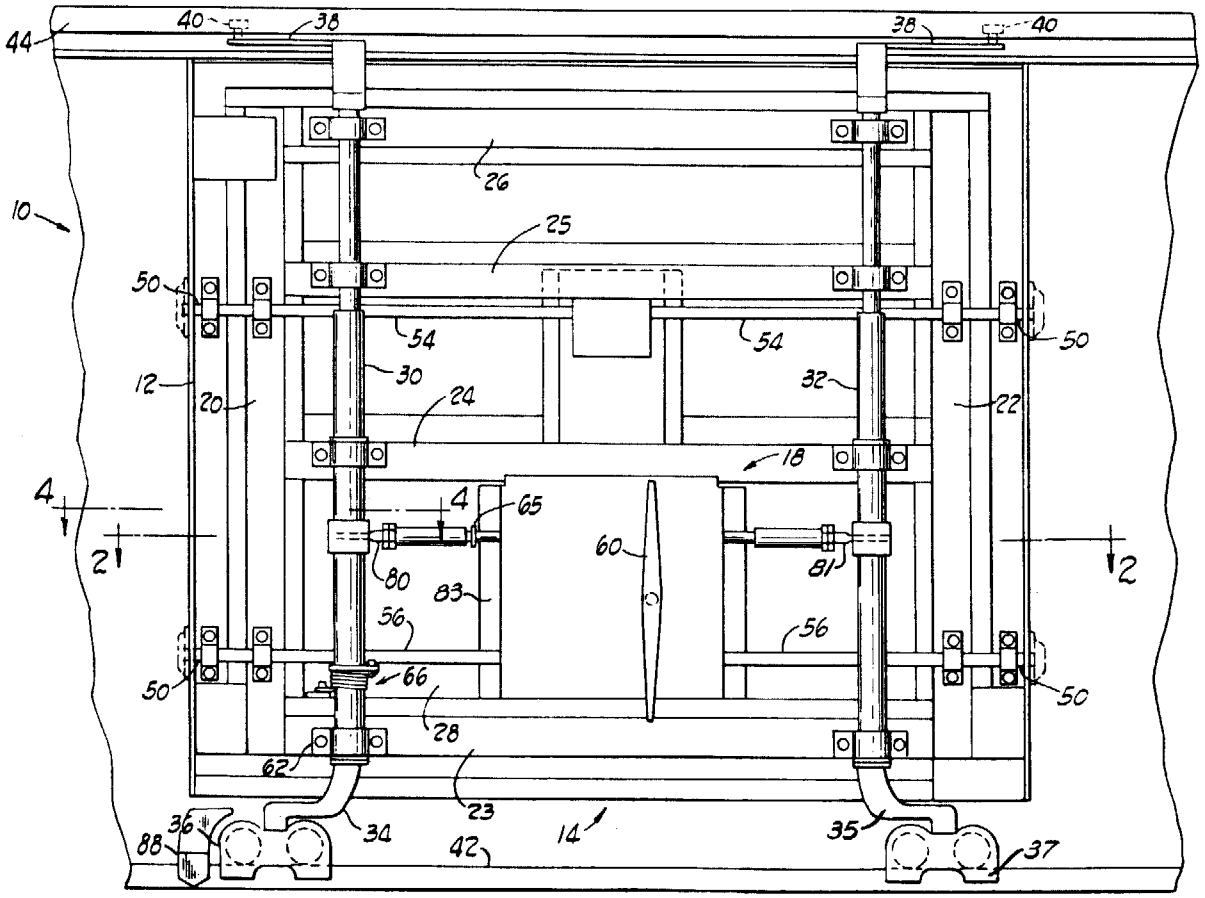
FIG. 1 is a front elevation of a plug-type rail car shown incorporating a preferred embodiment of the invention and showing the door in a closed position.
Figure 2:
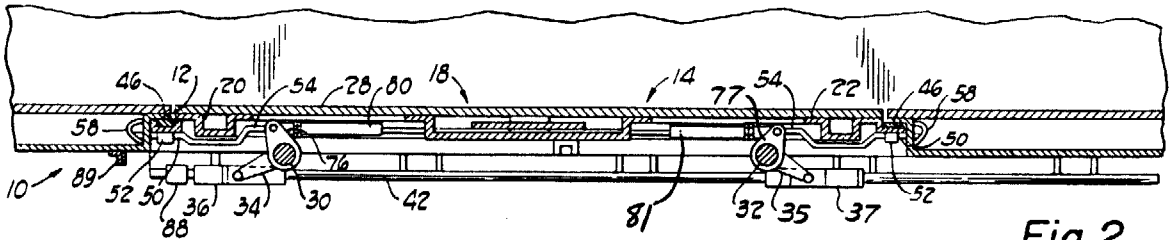
FIG. 2 is a cross-sectional view taken on line 2—2 showing the door in the closed position.

Referring more particularly to FIGS. 1 and 2, there is shown a railroad car indicated generally by the reference numeral 10 and having a side opening 12 in which is positioned a plug-type door assembly 14. The door assembly 14 is provided with an opening and closing mechanism indicated generally by the reference numeral 18.

Figure 3:
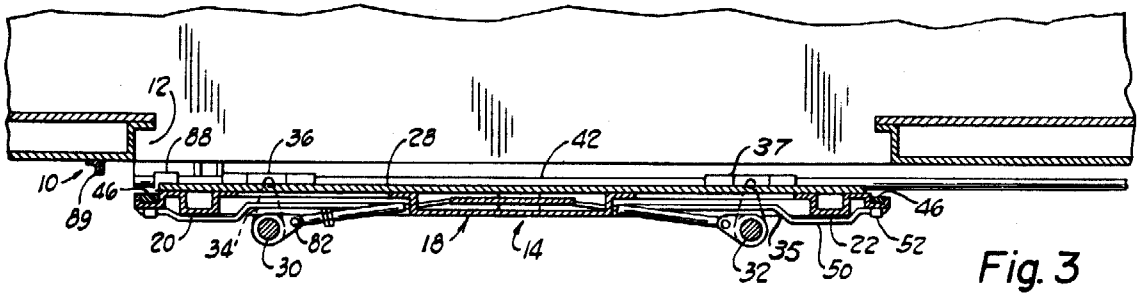
FIG. 3 is a cross-sectional view taken on line 2—2 of FIG. 1 but showing the door in an open position immediately prior to closing.

The structural details of the railroad car 10 and the general structural details of door 12 are not of particular importance to the invention; however, the door 12 is shown as formed from a pair of spaced, vertically extending frame members 20 and 22 each having the cross-section best shown in FIGS. 2 and 3. The members 20 and 22 are joined by somewhat similar, horizontally extending frame members 23 through 26. Connected to the back of the frame members, such as by welding, is a rectangular section of sheet metal 28 that closes the spaces between the door frame members and provides a rigid door structure.

As is customary with plug-type doors, the assembly 14 is mounted so that it can be moved laterally into and out of the opening 12 and, when in the open position, moved longitudinally of the car 10. As illustrated in FIG. 1, the door assembly 14 is carried on [a pair of] *first and second* vertically extending pipe or shaft members [30, 32.] *30 and 32 respectively*. At the lower end of each of the shafts 30, 32 are laterally extending *first and second* lever arm 34 *and 35 respectively*. [A roller hanger assembly 36 is] *First and second roller hanger assemblies 36 and 37 are respectively* pivotally mounted at the outer ends of each of the cranks or arms 34 *and 35*. Similarly, at the upper ends of shafts 30, 32, arms 38 are connected and extend laterally outward as shown. At the outer ends of each of the arms 38 there are provided guide rollers 40 which extend vertically upward for rotation about respective vertical axes. The roller hanger assemblies 36 *and 37* are each carried for movement on a track section 42 mounted longitudinally on the outer surface of the car. The upper guide rollers 40 are positioned for movement in a downwardly open guideway 44 which also extends longitudinally of the car.

As is apparent, rotation of the left and right shaft and crank assemblies in the clockwise and counterclockwise directions, respectively, cause the door to be swung outwardly away from the car, whereas, rotation in the opposite directions moves the door into engagement with the opening 12. As best shown in FIG. 2, a compression gasket or seal member 46 is preferably positioned about the peripheral edge of the door so that when the door is moved into the closed position, the gasket engages the inwardly extending flanges on the door opening to seal the door.

In the embodiment under consideration, means are provided for locking the door in its closed position. These means could take many forms but are illustrated by horizontally slidable lock bolt members 50. Each of the lock bolt members is carried by a pair of brackets 52 connected to the vertically extending door frame members 20, 22. The uppermost pair of lock bolt members 50 is driven by horizontally extending drive bars 54. Similarly, the lower set of lock bolts are arranged for driving movement by a horizontally extending pair of drive bars 56.

As best seen in FIG. 2, the ends of the lock bolt members 50 engage with generally cup-shaped keeper members 58 carried in the door opening 12. Preferably, and in accordance with the subject embodiment, the vertical pipes 30, 32 and the horizontally extending lock bolt members 50 are all driven from a common opening and closing mechanism 18. Mechanism 18 is manually operable from an exterior handle or crank member 60. The drive assembly 18 is shown and described in detail in commonly assigned [copending U.S. Pat. application, Ser. No. 50,288, filed June 26, 1970,] *U.S. Pat. No. 3,660,938*, for "Dual Brake Type Drive Mechanism" which is incorporated herein by reference. The assembly is arranged to prevent overspinning and drifting of the door. That is, when the door is in the process of being opened, the drive assembly functions to prevent outwardly acting forces on the door from causing the actuating handle to be driven out of control of the operator. This sometimes happens with prior plug door operating mechanisms when bulk contents such as grain and the like are being handled. Similarly, the mechanism is arranged so that when the door is in the open position, it cannot inadvertently drift back inwardly against the side of the car. That is, the mechanism locks the crank arms in their open position.

The actuating mechanism described in the aforementioned patent application solves two of the major problems with plug-type doors. An additional, previously mentioned problem present in plug-type doors resides in the movement of the door along the track and stopping of the door adjacent the opening. As can be appreciated, the door has substantial mass and must be stopped during longitudinal movement without damage to the door or its support and actuating mechanisms. This has been accomplished by various types of track stops and bumper arrangements. If the door is suddenly stopped by a fixed track mounted stop member which engages the wheels or roller hanger assemblies [36], substantial jarring of the wheels takes place which can damage the wheels and, also, the drive mechanism. Alternatively, if a bumper member or the like is arranged for engagement by the edge of the door, the bumper must extend outwardly an undue distance laterally of the car. Thus, when the door is closed for car travel, the bumper presents an objectionable extension of the car.

In the subject invention, the above problem is overcome by a unique crank assembly over-travel mechanism which is designed so that as the door moves toward a predetermined stop position, engagement of the *first* shaft and crank [assemblies] *assembly* with a stop member permits the leading edge of the door to swing inwardly to engage an inwardly mounted cushion or stop member and, therefore, to return outwardly to the full open position it had prior to engagement with the stop. The mechanism is arranged so that no loads are transmitted to the drive mechanism and both the overspin and anti-drift functions of the operating mechanism are retained.

Figure 6:
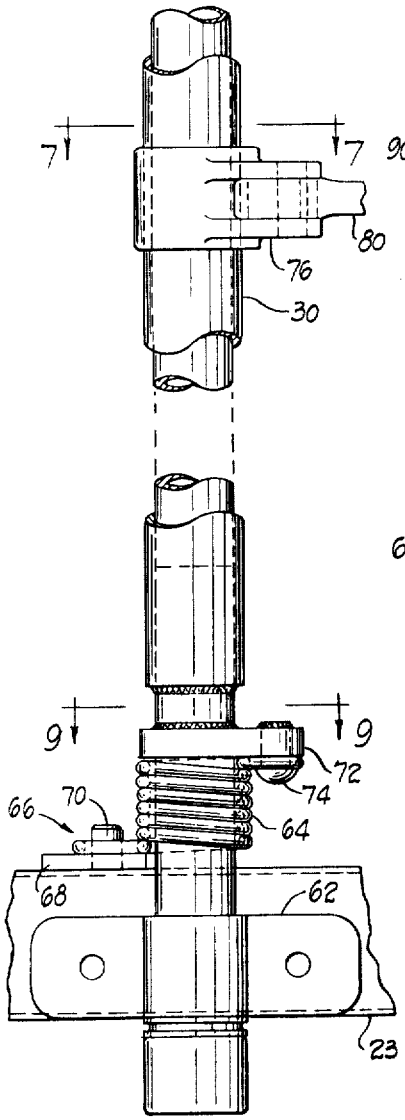
FIG. 6 is an enlarged elevation showing the return spring mechanism in detail.

The preferred form of the over-travel mechanism is as best shown in FIGS. 4 through 9. Referring in particular to FIG. 6, the vertical pipe or shaft 30 is pivotally mounted at its lower end by a bracket 62 or otherwise connected to the U-shaped frame members 23. A torsion spring member 64 is positioned about the lower end of the shaft 30 at a location immediately above the top surface of the frame member 23. One end of the spring 64 is connected to a spring retainer 66 comprised of a plate 68 and upwardly extending pin 70. The opposite end of the spring 64 is connected to a small spring flange or lever arm 72 rigidly connected to the pipe 30 such as by welding. It will be noted that a rivet or the like 74 passes through the end of the spring and is welded to the flange or lever arm 72.

In certain instances, the return spring would not be required since normal rebound from the energy absorbing cushion would return the door and crank and shaft assemblies to the position assumed prior to engagement with the stop. However, the use of the spring is much preferred since it assures that the door will always return to the full open position even when it is moving very slowly when it impacts the stop.

Figure 7:
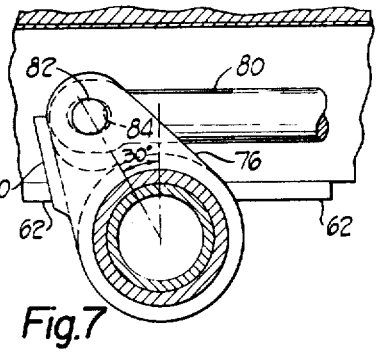
FIG. 7 is a cross-sectional view taken on line 7—7 of FIG. 6 showing the *first* door operating clevis when the door is in the closed position.

FIGS. 4, 5, and 7 through 9 illustrate the operation of the mechanism between the door opened and door closed positions. As best shown in FIGS. 2 and 7, when the door is in the closed position, the shaft operating [crank or clevis 76 makes an angle] *first and second crank or clevises 76 and 77 respectively make angles* of approximately 30 degrees relative to a plane perpendicular to the door panel face 78. It will be noted that *first* crank 76 is drivingly connected to the door operating mechanism 18 by a *first* rod 80 which is connected to the clevis 76 by a pin 82. *The second crank 77 is drivingly connected to the door operating mechanism by a second rod 81.* For reasons which will hereafter be discussed, the rod 80 has an elongated pin receiving slot 84. When the door is in the closed position illustrated in FIG. 5, the torsion spring 64 is in a no-torque position. That is, the spring is relaxed and under no load or slight reverse load. When the door operating mechanism is actuated to move the door to the open position, the operating clevis 76 is rotated to the position shown by solid lines in FIGS. 3, 4 and 8. During the rotation of the clevis, the pipe 30 (also pipe 32) is rotated to pivot the lower crank arms 34 *and 35* causing the door to move laterally out of the opening to the position shown in FIG. 3. During this opening movement, the spring 64 is slightly torqued. A stop 65 (see FIG. 1) is carried on actuating rod 80 to engage the drive housing [81] *83* to provide a positive indication that the door is fully open. It will be noted that the lower crank [arm 34 is] *arm 34 and 35* thus at a position perpendicular to the face of the door. The door is outwardly spaced on the side of the car and can freely move up and down the tracks 42, 44.

When it is desired to close the door, it is rolled to the left toward the door opening to the position shown in FIG. 2. Positioned on track 42 adjacent the opening is a stop member 88. It will be noted that the stop member 88 is arranged to engage the left *or first* roller trolley assembly 36 at a position adjacent the door opening. As shown, the stop preferably includes a portion which extends upwardly over the trolley assembly to prevent the assembly from lifting when it engages the stop. As can be appreciated, because of the mass of the door and the possibility of the door moving rapidly, substantial jarring could take place against the wheel trolleys and the drive mechanism if the door were completely stopped by engagement with the wheel trolleys. In the subject device, the over-travel mechanism functions to direct the leading edge of the door inwardly against an inwardly spaced resilient bumper stop 89 and thereafter, return the door to the position it had prior to engagement with the stop. Additionally, the mechanism prevents undue forces from being applied to the wheel carriage or the drive mechanism. Although a stop is shown only on the lower track 42, a stop could also be used on the upper track or guideway 44. In certain instances, this would be desirable.

Figure 4:
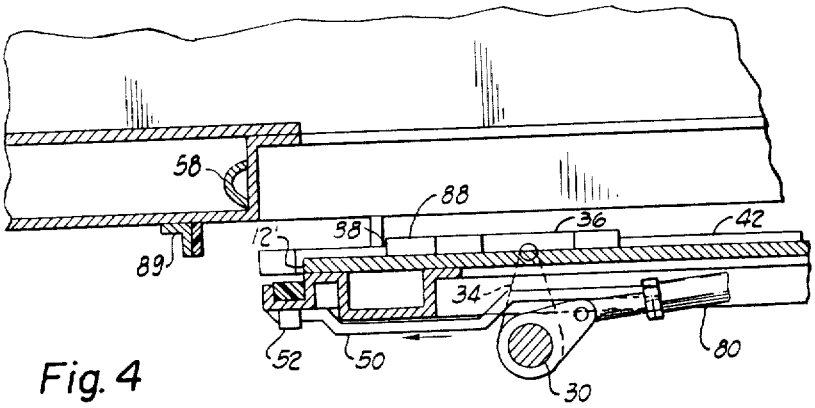
FIG. 4 is an enlarged cross-sectional view taken on line 4—4 of FIG. 1 but showing the door in an open position immediately prior to closing.
Figure 5:
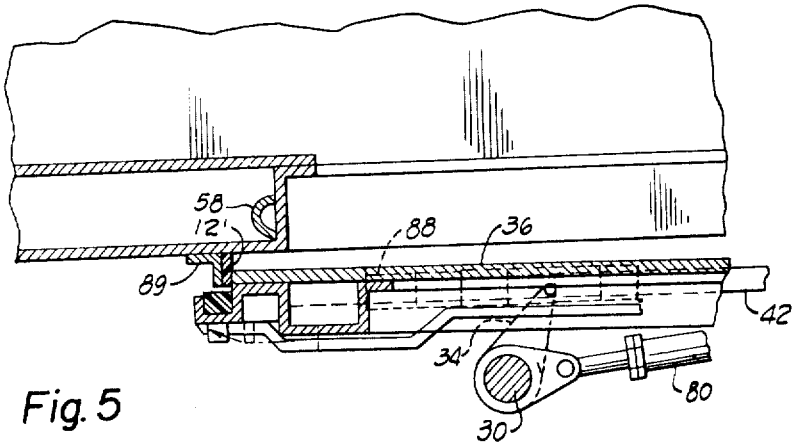
FIG. 5 is an enlarged cross-sectional view taken on line 4—4 of FIG. 1 but showing the position of the door as it impacts the shock absorbing cushion.
Figure 8:
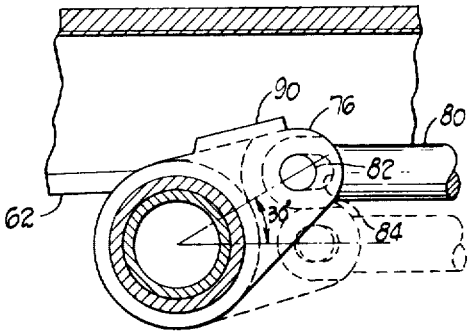
FIG. 8 is a cross-sectional view taken on line 7—7 of FIG. 6 but showing the *first* clevis in the open position.
Figure 9:
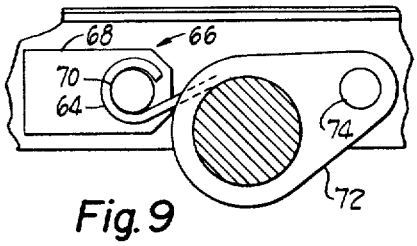
FIG. 9 is a cross-sectional view taken on line 9—9 of FIG. 4.

As will best be seen in FIG. 4, engagement of the wheel carriage 36 with the stop 88 causes the wheel trolley 36 to positively stop at the location shown. The door, however, continues to move to the left and pivots the crank 34 and the clevis 76 to the *third* position shown in FIG. 5. The right hand shaft 32 and trolley assembly [36] *37* do not pivot but continue moving with the door. This causes the door's leading edge 12' to swing inwardly toward the side of the car. As the leading edge pivots inwardly, it comes into engagement with the resilient bumper or stop 89 thus absorbing and dissipating the kinetic energy in the door. During the final pivoting movement, i.e., the movement from the position shown in FIG. 4 to the position shown in FIG. 5, the return spring 64 is further torqued. (FIG. 8 shows the movement of crank 76 during this period.) Thus, after engagement with the cushion, the return spring causes the door and the crank to be returned to the solid line position in FIG. 6. It will be noted that the elongated slot 84 acts as a lost motion connection to permit the inward movement and prevents any load from being applied to the actuating rod 80 during movements between the normal door open and cushion engaging positions. When the elements have assumed the solid line positions in FIGS. 8 and 9, normal actuating of the manual operating mechanism can be carried out to close the door into engagement with the opening.

An additional feature which should be noted is the presence of a cam plate member 90 carried on the actuating clevis 76. The cam acts during the last part of the action. Note that as the rod 80 is moved from the position of FIG. 7 to the position of FIG. 8, the cam engages the lateral surface of the rod head to provide a final camming action operation to eliminate the lost motion during closure.

As is readily apparent, the described mechanism allows the door to be pivoted inwardly against an inwardly positioned stop and does not interfere with the functioning of the anti-drift mechanism. Thus, the anti-drift mechanism is fully operative throughout all movements of the door while allowing limited desired movements to absorb the impact of the door closing operation and also, a final positioning of the mechanism.

The invention has been described in great detail sufficient to enable one of ordinary skill in the door art to make and use the same. Obviously, modifications and alterations of the preferred embodiment will occur upon a reading and understanding of the specification and it is our intention to include all such modifications and alterations as part of our invention insofar as they come within the scope of the appended claims.

What is claimed is:

1. A plug-type rail car door assembly comprising:

a door member;

at least [a pair of] *first and second* shaft and crank assemblies supporting said door on *respective first and second* roller means for permitting said door assembly to be moved in a first direction longitudinally toward a door opening and in a second direction longitudinally away from a door opening, said assemblies having cranks mounted to be rotated through an arc defined by a first door closed position and a second door open position wherein said cranks are substantially normal to said door and *at least said first shaft and crank assembly including one of said cranks mounted to be rotated to* a third position beyond said second position from said first position, actuating means for rotating said shaft and crank assemblies to cause said door member to move out of and into said door opening as said cranks are moved respectively from said first position to said second position and from said second position to said first position, said actuating means including means maintaining the cranks of said assemblies in said second position during longitudinal movement of said door on said roller means, stop means for engaging *at least said first of* said roller means to stop *said first of* said roller means at a predetermined point relative to said opening during longitudinal movement of said door in said first direction;

cushion means adjacent said opening and inwardly of the edges of the door when said cranks are in said second position;

over-travel means including spring means connected between said door and *at least said first of said* crank [assembly] *assemblies,* whereby upon engagement of *said first of* said roller means with said stop means the edge of the door in the direction of travel pivots inwardly, relative to its position during longitudinal movement, toward said cushion means to absorb the kinetic energy in the door as [the cranks move] *said first crank moves* from [their] *its* second position to [their]*its* third position and by action of the spring means back to the second position.

2. The invention as described in claim 1 wherein said actuating means includes [a rod] *first and second rods* pivotally attached to [a clevis] *first and second clevises* rigidly mounted *respectively* on [said shaft means] *at least said first and second shafts of said shaft and crank assemblies* for selectively maintaining said door in a position outwardly of said door opening during longitudinal movement.

3. The improvement as described in claim 2 wherein said over-travel means includes a lost motion connection between said *first* rod and *first* clevis and a coil spring member positioned about a portion of said *first* shaft and crank assembly and connected between said door and said *first* shaft and crank assembly.

4. The improvement as described in claim 3 including means operative to indicate proper pre-torquing of the spring means when the door is in the open position.

References Cited

The following references, cited by the Examiner, are of record in the patented file of this patent or the original patent.

UNITED STATES PATENTS

| | | | |
|---|---|---|---|
| 1,221,971 | 4/1917 | Copony | 49—218 |
| 3,494,074 | 2/1970 | Herr | 49—220 |
| 3,334,441 | 8/1967 | Landis et al. | 49—220 |

KENNETH DOWNEY, Primary Examiner

UNITED STATES PATENT OFFICE

CERTIFICATE OF CORRECTION

Patent No. Re. 28,443 Dated June 10, 1975

Inventor(s) Irving D. Ross, Jr.

It is certified that error appears in the above-identified patent and that said Letters Patent are hereby corrected as shown below:

Column 2, line 21, delete the word [extending] after the word "extending" and before the word "shaft".

Column 3, line 40, change the word "arm" to --arms--.

Column 4, line 52, delete the word "therefore" and insert the word --thereafter--.

Column 5, line 32, change the word "arm" to --arms--.

Signed and Sealed this twenty-third Day of December 1975

[SEAL]

Attest:

RUTH C. MASON
*Attesting Officer*

C. MARSHALL DANN
*Commissioner of Patents and Trademarks*